United States Patent
Kim et al.

(10) Patent No.: US 8,473,639 B2
(45) Date of Patent: Jun. 25, 2013

(54) METHOD AND APPARATUS FOR PERFORMING NON ACCESS STRATUM (NAS) PROCEDURE IN MULTI-MODE TERMINAL

(75) Inventors: Jae Cheon Kim, Anyang-si (KR); Mun Yong Han, Anyang-si (KR); Il Hwan Kim, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 12/943,713

(22) Filed: Nov. 10, 2010

(65) Prior Publication Data

US 2011/0113157 A1    May 12, 2011

Related U.S. Application Data

(60) Provisional application No. 61/260,013, filed on Nov. 11, 2009.

(30) Foreign Application Priority Data

Jul. 26, 2010    (KR) ........................ 10-2010-0071771

(51) Int. Cl.
*G06F 15/16* (2006.01)
(52) U.S. Cl.
USPC .......................................... 709/248; 370/331
(58) Field of Classification Search
USPC ............................ 709/248; 270/331; 370/331
See application file for complete search history.

(56) References Cited

U.S. PATENT DOCUMENTS

| | | | | |
|---|---|---|---|---|
| 8,295,247 | B2* | 10/2012 | De Jong et al. | 370/331 |
| 2004/0266435 | A1* | 12/2004 | de Jong et al. | 455/436 |
| 2009/0232097 | A1* | 9/2009 | Taneja | 370/331 |
| 2009/0258631 | A1* | 10/2009 | Forsberg et al. | 455/411 |
| 2010/0189071 | A1* | 7/2010 | Kitazoe | 370/331 |
| 2010/0195618 | A1* | 8/2010 | Park et al. | 370/331 |
| 2010/0291927 | A1* | 11/2010 | Wu et al. | 455/435.3 |
| 2012/0213140 | A1* | 8/2012 | Olsson et al. | 370/311 |

* cited by examiner

*Primary Examiner* — Firmin Backer
*Assistant Examiner* — Jonathan Bui
(74) *Attorney, Agent, or Firm* — Birch, Stewart, Kolasch & Birch, LLP (57) ABSTRACT

A method and apparatus for performing a NAS procedure in a NAS module of a multi-mode terminal are disclosed. A method for performing a NAS procedure in a multi mode NAS (mNAS) module of a multi-mode terminal includes receiving a NAS procedure request signal from a user, and selecting a first NAS; transmitting the NAS procedure request signal to a NAS module corresponding to the first NAS; receiving a NAS procedure response signal, that includes an execution result of a NAS procedure between the NAS module corresponding to the first NAS and a network, from the NAS module corresponding to the first NAS; performing synchronization between the NAS module corresponding to the first NAS and a NAS module corresponding to a second NAS according to the NAS procedure execution result; and transmitting a NAS procedure response signal including the NAS procedure execution result to the user.

6 Claims, 8 Drawing Sheets

METHOD AND APPARATUS FOR PERFORMING NON ACCESS STRATUM (NAS) PROCEDURE IN MULTI-MODE TERMINAL

This application claims the benefit of the U.S. Provisional Patent Application No. 61/260,013, filed on Nov. 11, 2009 and the Korean Patent Application No. 10-2010-0071771, filed on Jul. 26, 2010, which is hereby incorporated by reference as if fully set forth herein.

BACKGROUND OF THE INVENTION

1. Field of the Invention

The present invention relates to a multi-mode terminal, and more particularly to a method and apparatus for performing a Non Access Stratum (NAS) procedure in a multi-mode terminal.

2. Discussion of the Related Art

Wireless mobile communication technology is being rapidly developed not only for voice communication but also for high-speed transmission/reception of data. Nowadays, a fourth generation mobile communication technology, for example, a Long Term Evolution (LTE) wireless communication system is a focus of attention. However, when a fourth generation communication network and a third generation communication network coexist, a mobile communication terminal or a mobile communication data card must include not only fourth generation mobile communication technology but also third generation mobile communication technology, which is still highly prevalent globally. Therefore, in order to simultaneously support next generation mobile communication technology and legacy mobile communication technology, a mobile communication terminal having a dual modem processor and a data-card type device (hereinafter referred to as a multi-mode terminal) are needed.

The multi-mode terminal includes two modems having different communication schemes so as to support different communication schemes using the two modems. Generally, the dual modem devices have been widely used in a region including heterogeneous communication networks. As representative examples of the dual modem device, a Long Term Evolution (LTE) wireless communication device and a Code Divisional Multiple Access (CDMA) communication device are being intensively researched by many developers and companies.

SUMMARY OF THE INVENTION

Accordingly, the present invention is directed to a method and apparatus for performing a NAS procedure in a multi-mode terminal that substantially obviate one or more problems due to limitations and disadvantages of the related art.

An object of the present invention is to provide a method and apparatus for performing a NAS procedure in a multi-mode terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing a Non Access Stratum (NAS) procedure in a multi mode NAS (mNAS) module of a multi-mode terminal includes receiving a NAS procedure request signal from a user, and selecting a first NAS; transmitting the NAS procedure request signal to a NAS module corresponding to the first NAS; receiving a NAS procedure response signal, that includes an execution result of a NAS procedure between the NAS module corresponding to the first NAS and a network, from the NAS module corresponding to the first NAS; performing synchronization between the NAS module corresponding to the first NAS and a NAS module corresponding to a second NAS according to the NAS procedure execution result; and transmitting a NAS procedure response signal including the NAS procedure execution result to the user.

The method may further include, if handover occurs in a NAS procedure between the NAS module corresponding to the first NAS and the network, receiving a NAS procedure failure response from the NAS module corresponding to the first NAS; transmitting the NAS procedure request signal to the NAS module corresponding to the second NAS; and receiving a NAS procedure response signal, that includes an execution result of a NAS procedure between the NAS module corresponding to the second NAS and a network, from the NAS module corresponding to the second NAS.

One of the first NAS and the second NAS may be an enhanced NAS (eNAS) of a Long Term Evolution (LTE) system.

The performing of synchronization between the NAS modules may include performing context mapping to the second NAS in relation to the NAS procedure execution result.

In another aspect of the present invention, a multi-mode terminal includes a plurality of Non Access Stratum (NAS) modules for performing a NAS procedure related to a network; and a multi mode NAS module for receiving a NAS procedure request signal from a user, selecting a first NAS, transmitting the NAS procedure request signal to a NAS module corresponding to the first NAS, and transmitting a NAS procedure response signal to the user, wherein the multi mode NAS module receives the NAS procedure response signal, that includes an execution result of a NAS procedure between the NAS module corresponding to the first NAS and a network, from the NAS module corresponding to the first NAS, and performs synchronization between the NAS module corresponding to the first NAS and a NAS module corresponding to a second NAS according to the NAS procedure execution result.

If handover occurs in a NAS procedure between the NAS module corresponding to the first NAS and the network, the multi-mode terminal NAS module may receive a NAS procedure failure response from the NAS module corresponding to the first NAS, transmit the NAS procedure request signal to the NAS module corresponding to the second NAS, receive a NAS procedure response signal, that includes an execution result of a NAS procedure between the NAS module corresponding to the second NAS and the network, from the NAS module corresponding to the second NAS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a 3GPP LTE mobile communication system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in block diagram form on the basis of the important functions of the present invention. Wherever possible, the same reference numbers will be used throughout the drawings to refer to the same or like parts.

For convenience of description and better understanding of the present invention, the present invention assumes that a WCDMA or CDMA network other than the LTE network will hereinafter be referred to as a legacy network. In the following description, a terminal or device may refer to a mobile or fixed user equipment (UE), for example, a user equipment (UE), a mobile station (MS) and the like. Also, the base station (BS) may refer to an arbitrary node of a network end which communicates with the above terminal or device, and may include a Node B (Node-B), an eNode B (eNode-B), and an access point (AP) and the like.

Figure 1:
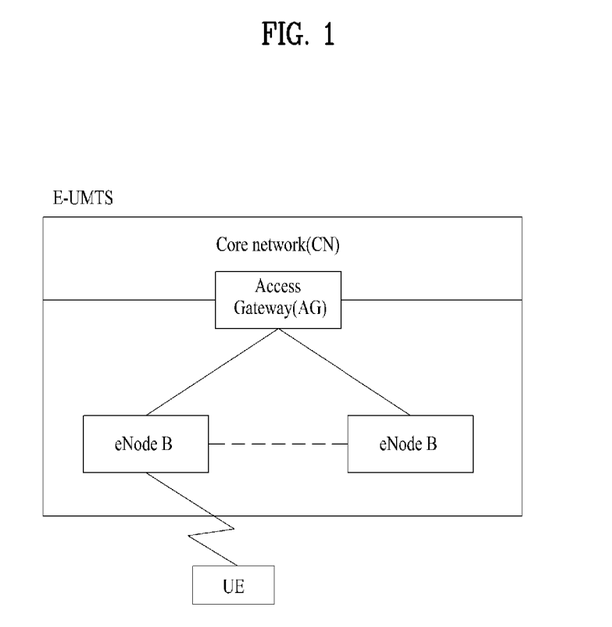
FIG. 1 is a conceptual diagram illustrating an Evolved Universal Terrestrial Radio Access Network (E-UTRAN) network structure.

FIG. 1 is a conceptual diagram illustrating an Evolved Universal Terrestrial Radio Access Network (E-UTRAN) network structure. In particular, the Enhanced Universal Mobile Telecommunication Systems (E-UMTS) system has evolved from a legacy WCDMA UMTS system, and basic standardization thereof is now being conducted by the 3rd Generation Partnership Project (3GPP). The E-UMTS system may also be called a Long Term Evolution (LTE) system. For details of the technical specifications of the UMTS and E-UMTS systems, refer to Release 7 and Release 8 of "3rd Generation Partnership Project; Technical Specification Group Radio Access Network".

As shown in FIG. 1, the E-UMTS system largely includes a User Equipment (UE), a base station (or eNB), and an Access Gateway (AG) which is located at an end of a network (E-UTRAN) and is connected to an external network. Generally, an eNB can simultaneously transmit multiple data streams for a broadcast service, a multicast service and/or a unicast service. An interface for transmission of user traffic or control traffic may be located between eNBs.

The AG may be divided into a part that handles processing of user traffic and a part that handles control traffic. Here, the AG part for processing new user traffic and the AG part for processing control traffic can communicate with each other using a new interface. The AG manages mobility of a UE on a Tracking Area (TA) basis. The TA includes a plurality of cells. When the UE has moved from a specific TA to another TA, the UE notifies the AG that the TA where the UE is located has changed.

A Core Network (CN) may include the AG and a network node or the like for user registration of the UE. An interface for discriminating between the E-UTRAN and the CN may be used.

Figure 2:
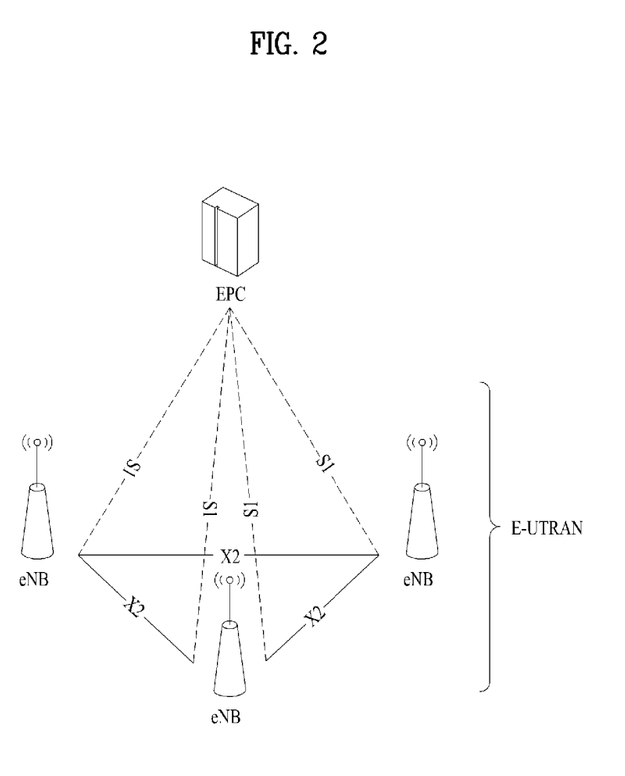
FIG. 2 is a conceptual diagram illustrating an E-UTRAN network structure.

FIG. 2 illustrates a network structure of an Evolved Universal Terrestrial Radio Access Network (E-UTRAN) system which is a mobile communication system to which the embodiment of the present invention is applied.

The E-UTRAN system is an evolved version of the conventional UTRAN system. The E-UTRAN includes one or more cells that will also be referred to as "eNode B(s)" or "eNB(s)". The eNBs are connected through an X2 interface. Each eNB is connected to the User Equipment (UE) through a radio interface and is connected to an Evolved Packet Core (EPC) through an S1 interface.

The EPC may include a Mobility Management Entity (MME), a Serving-Gateway (S-GW), and a Packet Data Network-Gateway (PDN-GW). The MME may include UE access information or UE capability information, and this information is generally adapted to manage UE mobility. The S-GW is a gateway in which the E-UTRAN is located at an end point, and the PDN-GW is a gateway in which a Packet Data Network (PDN) is located at an end point.

Figure 3:
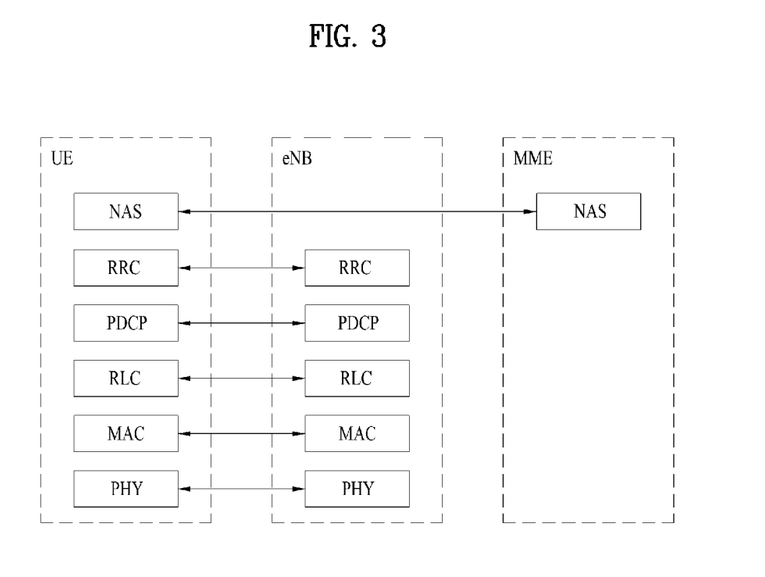
FIGS. 3 and 4 illustrate a control plane and a user plane (U-Plane) of a radio interface protocol between a User Equipment (UE) and an E-UTRAN according to the 3GPP wireless access network standard.
Figure 4:
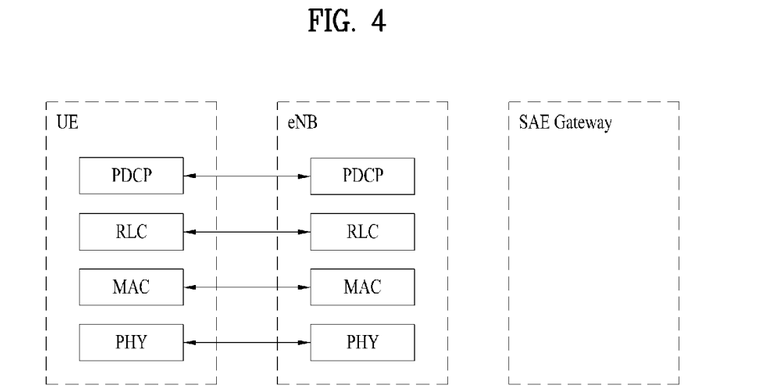

FIGS. 3 and 4 illustrate a control plane and a user plane (U-Plane) of a radio interface protocol between a User Equipment (UE) and an E-UTRAN according to the 3GPP wireless access network standard. The radio interface protocol is divided vertically into a physical layer, a data link layer and a network layer, and horizontally into a user plane for data transmission and a control plane for signaling.

The protocol layers of FIGS. 3 and 4 can be divided into an L1 layer (first layer), an L2 layer (second layer) and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer enables reliable data transmission. The functions of the RLC layer may also be implemented through internal functional blocks of the MAC layer. In this case, the RLC layer need not exist. A Packet Data Convergence Protocol (PDCP) layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages.

In FIG. 3, a Non-Access Stratum (NAS) layer located above the RRC layer performs functions such as session management and mobility management. The NAS layer exists in the Mobility Management Entity (MME) of the UE and network.

The MME is a kernel control node of the LTE access network. The MME performs tracking and paging of a UE in an idle state. The MME participates in a radio bearer activation/deactivation process. In case of either 'Initial Attach' or intra-LTE handover having core network relocation, the MME takes charge of a serving gateway (SGW) selection associated with the UE. The MME performs UE authentication by interacting with a Home Subscriber Server (HSS). NAS signaling is ended at the MME, and the MME generates a temporary identifier and allocates this temporary identifier to the UE. The MME determines whether or not the UE has camp-on authority associated with a Public Land Mobile Network (PLMN) of a service provider. The MME is an end point for protecting the encryption/integrity for NAS signaling, and manages a security key. The MME provides a control plane function for mobility between the LTE and the 2G/3G access network.

In order to manage UE mobility, an EPS Mobility Management-REGISTERED (EMM-REGISTERED) status and an EMM-DEREGISTERED status are defined in the NAS layer. The EMM-REGISTERED status and the EMM-DEREGISTERED state are applied to a Mobility Management Entity (MME). The user equipment (UE) is initially in the EMM-DEREGISTERED status, and carries out an 'Initial Attach' procedure to access a network, such that it is registered in this network. If this 'Attach' procedure has been successfully carried out, the UE and the MME enter the EMM-REGISTERED state.

In order to manage a signaling connection between the UE and the EPC, an EPS Connection Management (ECM)-IDLE status and an ECM-CONNECTED status are defined. The above-mentioned statuses are applied to the UE and the MME. The UE in the ECM-IDLE state is in the ECM-CONNECTED state when it establishes an RRC connection with an E-UTRAN. If the MME of the ECM-IDLE state makes an S1 connection with the E-UTRAN, it enters the ECM-CONNECTED state. If the UE is in the ECM-IDLE state, the E-UTRAN has no context information of the UE. Therefore, the UE of the ECM-IDLE state carries out an UE-based mobility procedure (e.g., cell selection or cell reselection) without receiving a command from the network. Otherwise, if the UE is in the ECM-CONNECTED state, UE mobility is managed by the network. If the UE is in the ECM-IDLE state and the UE's location recognized by the network changes to another UE location, the UE performs a Tracking Area Update procedure, such that it informs the network of the UE's location.

Figure 5:
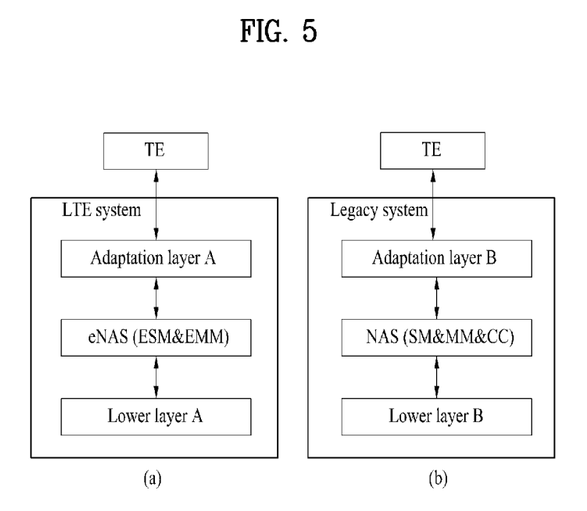
FIG. 5 is a structural view illustrating protocol stacks for use in an LTE system and a legacy system.

FIG. 5 is a structural view illustrating protocol stacks for use in an LTE system and a legacy system. Referring to FIG. 5, the LTE system includes an eNAS layer, and the legacy system includes a NAS layer. That is, the eNAS layer and the NAS layer perform a mobility management function and a session management function in individual Radio Access Technology (RAT) environments, and may include an interface independent of an adaptation layer and a lower layer.

Figure 6:
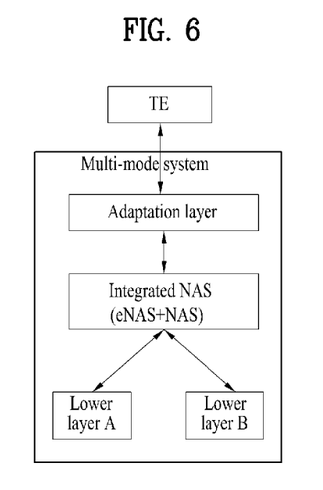
FIG. 6 is a structural view illustrating a protocol stack for supporting a multi-mode terminal.

FIG. 6 is a structural view illustrating a protocol stack for supporting a multi-mode terminal.

Referring to FIG. 6, one integrated NAS may be adapted to integrate a protocol stack of the legacy system and a protocol stack of the LTE system. However, in order to integrate the conventional NAS and the eNAS into one integrated NAS, it is necessary to greatly modify not only an interface for an upper layer but also an interface for a lower layer dependent upon RAT.

Meanwhile, the stability of a commercialized legacy protocol stack has already been authorized. In contrast, the LTE protocol stack is one step away from commercialization, and it is difficult to completely authorize the stability of the LTE protocol stack. Therefore, integration of two protocol stacks may unexpectedly threaten not only the legacy protocol stack but also the LTE protocol stack.

Therefore, in order to integrate the protocol stack of the legacy system and the protocol stack of the LTE system, the present invention adds a multi mode NAS, such that inter RAT mobility requisite for 3GPP Release 8 can be stably guaranteed and functions requisite for the multi-mode terminal can also be stably carried out.

Figure 7:
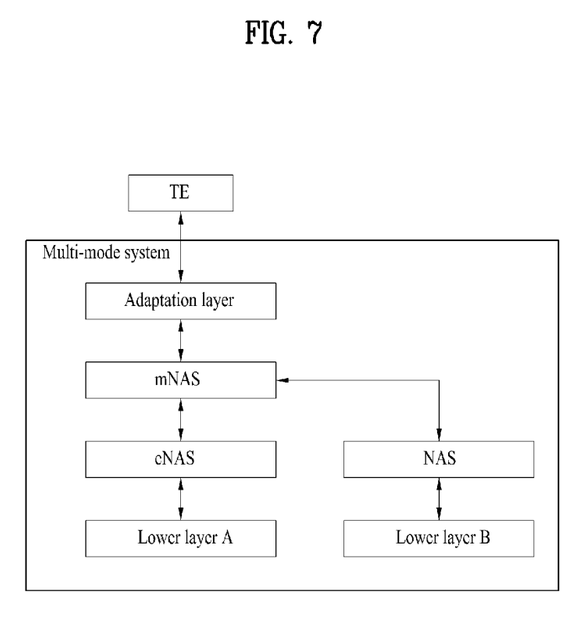
FIG. 7 is a structural view illustrating a protocol stack for supporting a multi-mode terminal according to an embodiment of the present invention.

FIG. 7 is a structural view illustrating a protocol stack for supporting a multi-mode terminal according to an embodiment of the present invention.

Referring to FIG. 7, for the matching of individual protocol stacks, a protocol stack according to the present invention includes a multi mode NAS, and the multi mode NAS performs only functions requisite for the matching between eNAS and NAS. For example, message adaptation, active NAS, active NAS switching, and NAS context mapping, etc., may be performed. In this case, the active NAS means an eNAS or NAS that can be serviced through a currently camped-on cell. In addition, NAS context or eNAS context may include EMM/MM context, ESM/GSM context, security context, etc.

In addition, eNAS and NAS need to share NAS context generated from independent procedures in individual RATs, and mNAS may perform NAS context synchronization on the basis of context mapping.

Functions and operations of the multi mode NAS will hereinafter be described with reference to FIGS. 8 to 10. In particular, for convenience of description and better understanding of the present invention, a Terminal Equipment (TE) for controlling a terminal end such as a user interface in a multi-mode terminal is independently shown in FIGS. 8 to 10.

Figure 8:
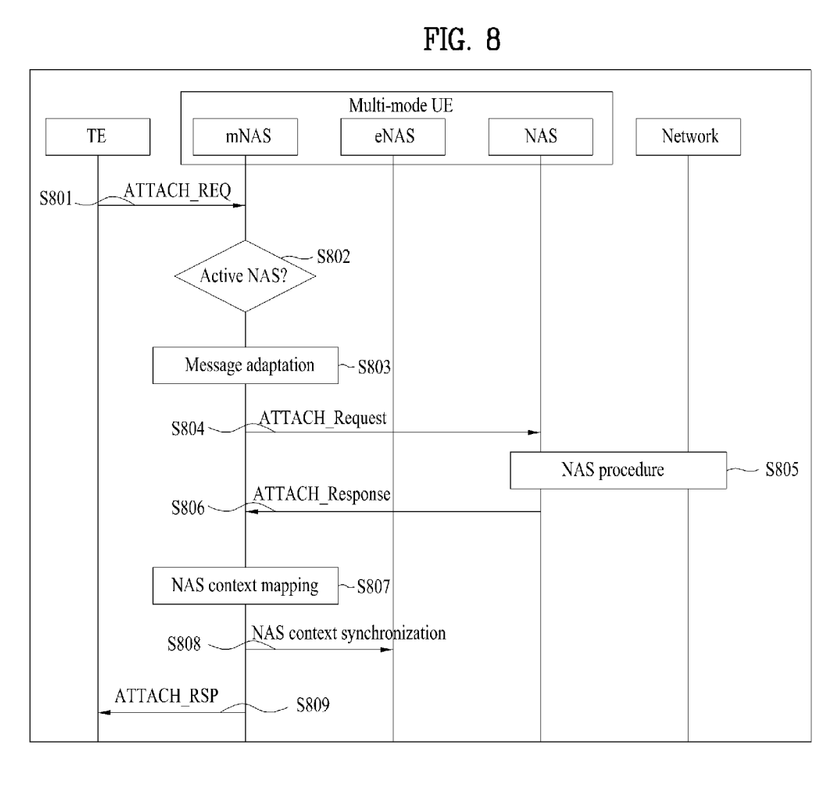
FIG. 8 is a flowchart illustrating operations of a multi-mode NAS function according to an embodiment of the present invention.

FIG. 8 is a flowchart illustrating operations of a multi-mode NAS function according to an embodiment of the present invention. Specifically, as shown in FIG. 8, it is assumed that the UE triggers an initial access procedure from among the NAS procedures.

Referring to FIG. 8, the TE transmits a request message (ATTACH_REQ) for the initial access procedure to a multi mode NAS (mNAS) by interfacing with an upper layer (Step 801). mNAS may select an active NAS from among the eNAS of the LTE and the NAS of the legacy network (Step S802). For convenience of description and better understanding of the present invention, it is assumed that the NAS of the legacy network is an active NAS.

Subsequently, mNAS may perform message adaptation of a request message for triggering the active NAS (Step 803). mNAS may transmit the adaptation-processed request message (ATTACH_Request) to the legacy NAS (Step 804). The legacy NAS performs a specific NAS procedure in relation to a network (i.e., MME) in step 805.

Meanwhile, the legacy NAS having completed the initial access procedure transmits a response message (ATTACH_Response) to the mNAS in step 806. The mMAS may perform NAS context mapping in step 807. In step 808, the mNAS transmits the NAS context mapping result to the eNAS serving as an inactive NAS, so that it synchronizes the NAS context. Finally, the mNAS transmits the initial access procedure result (ATTACH_RSP) to the TE in step 809.

Figure 9:
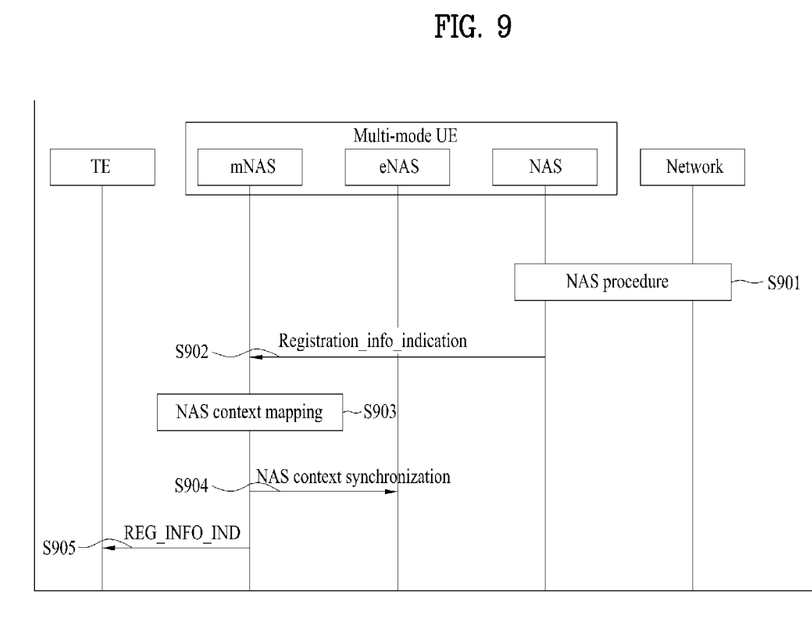
FIG. 9 is a flowchart illustrating operations of a multi-mode NAS function according to another embodiment of the present invention.

FIG. 9 is a flowchart illustrating operations of a multi-mode NAS function according to another embodiment of the present invention. Specifically, as shown in FIG. 9, it is assumed that the NAS of the legacy network is an active NAS and a network (i.e., MME) triggers a registration procedure from among the NAS procedures.

Referring to FIG. 9, a NAS of a legacy network and a network perform a registration procedure from among the NAS procedures (Step 901). Thereafter, the NAS of the legacy network transmits an indicator (Registration_info_indication) indicating the registration procedure result to the mNAS (Step 902).

Subsequently, mNAS performs NAS context mapping in step 903, and transmits the NAS context mapping result to the eNAS serving as an inactive NAS, such that it synchronizes the NAS context. Finally, mNAS may transmit the registration procedure result (REG_INFO_IND) to the TE in step 905.

Figure 10:
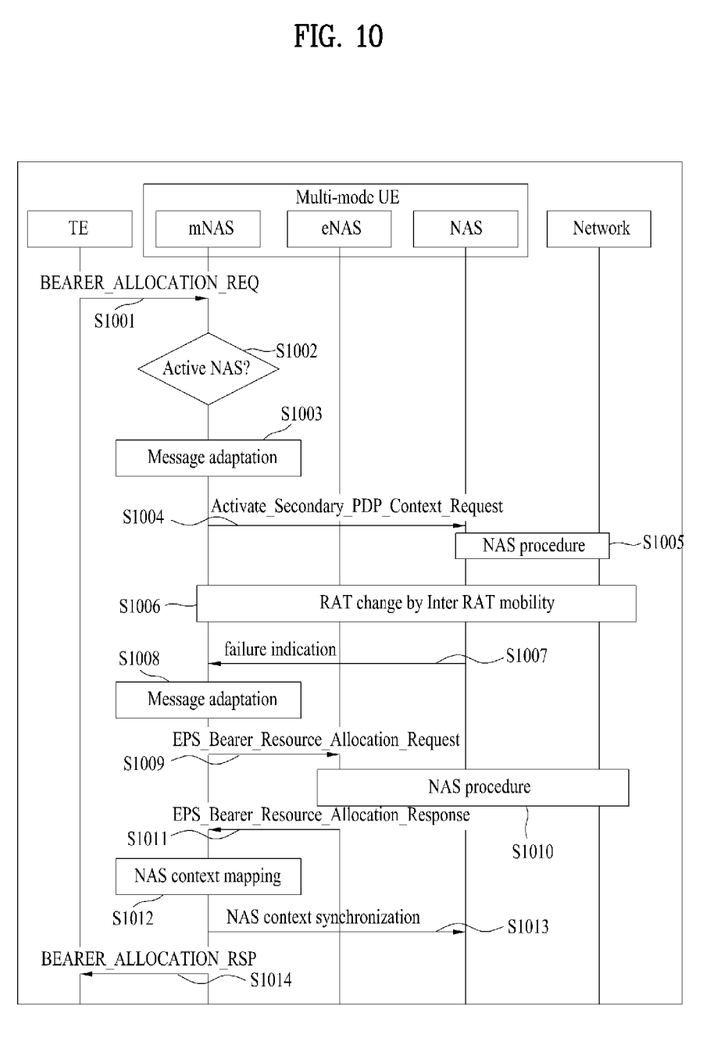
FIG. 10 is a flowchart illustrating operations of a multi-mode NAS function according to still another embodiment of the present invention.

FIG. 10 is a flowchart illustrating operations of a multi-mode NAS function according to still another embodiment of the present invention. Specifically, as shown in FIG. 10, it is assumed that RAT change occurs in a radio bearer (RB) allocation procedure corresponding to the UE-triggered NAS procedure.

Referring to FIG. 10, the TE transmits a request message (BEARER_ALLOCATION_REQ) for a Radio Bearer (RB) allocation procedure to the mNAS by interfacing with an upper layer (Step 1001). mNAS may select an active NAS from among the eNAS of the LTE and the NAS of the legacy network in step 1002. For convenience of description and better understanding of the present invention, it is assumed that the NAS of the legacy network is an active NAS.

Subsequently, mNAS may perform adaptation of a request message for triggering an active NAS (i.e., legacy NAS) in step 1003. mNAS may transmit an adaptation-processed request message (Activate_Secondary_PDP_Context_Request) to the legacy NAS in step 1004. The legacy NAS performs an RB allocation procedure in relation to the network (i.e., MME) in step 1005.

Meanwhile, during the aforementioned RB allocation procedure, RAT change (e.g., handover) may be performed in step 1006. In this case, the legacy NAS may inform the mNAS of the failure of the specific NAS procedure in step 1007. Upon receiving information about the RB allocation procedure failure and information about the RAT change, mNAS may recognize the necessity for a procedure entity to be changed from the legacy NAS to the eNAS. In this case, the mNAS performs the active NAS switching function such that the active NAS is switched from the legacy NAS to the LTE eNAS.

The mNAS performs adaptation of a request message for triggering an active NAS (i.e., LTE eNAS) in step 1008, and transmits the adaptation-processed request message (EPS_Bearer_Resource_Allocation_Request) to the LTE eNAS in step 1009. In addition, the LTE eNAS performs the RB allocation procedure in relation to the MME (Step 1010).

Meanwhile, the LTE eNAS having completed the specific NAS procedure transmits a response message (EPS_Bearer_Resource_Allocation_Response) to the mNAS (Step 1011). mNAS may perform NAS context mapping in step 1012. In step 1013, mNAS transmits the NAS context mapping result to the legacy NAS serving as an inactive NAS, so that it can synchronize the NAS context. Finally, mNAS transmits the RB allocation procedure result (BEARER_ALLOCATION_RSP) to the TE in step 1014.

As apparent from the above description, the exemplary embodiments of the present invention have the following effects. The method and apparatus for performing a NAS procedure in a multi-mode terminal according to the embodiments of the present invention can perform inter-RAT communication without significantly modifying a legacy protocol stack, and can guarantee maximum stability between a legacy protocol stack and an LTE protocol stack.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing a Non Access Stratum (NAS) procedure in a multi mode NAS (mNAS) module of a multi-mode terminal, the method comprising:
   receiving a NAS procedure request signal from a user, and selecting a first NAS;
   transmitting the NAS procedure request signal to a NAS module corresponding to the first NAS;
   receiving a NAS procedure response signal including an execution result of a first NAS procedure between the NAS module corresponding to the first NAS and a network, from the NAS module corresponding to the first NAS;
   performing synchronization between the NAS module corresponding to the first NAS and a NAS module corresponding to a second NAS according to the first NAS procedure execution result;
   transmitting a NAS procedure response signal including the first NAS procedure execution result to the user;
   receiving a NAS procedure failure response from the NAS module corresponding to the first NAS, when a handover occurs in the first NAS procedure;
   transmitting the NAS procedure request signal to the NAS module corresponding to the second NAS, when the handover occurs in the first NAS procedure; and
   receiving a NAS procedure response signal including an execution result of a second NAS procedure between the NAS module corresponding to the second NAS and the network, from the NAS module corresponding to the second NAS, when the handover occurs in the first NAS procedure.

2. The method according to claim 1, wherein one of the first NAS and the second NAS is an enhanced NAS (eNAS) of a Long Term Evolution (LTE) system.

3. The method according to claim 1, wherein the performing of synchronization between the NAS modules includes:
   performing context mapping to the second NAS in relation to the first NAS procedure execution result.

4. A multi-mode terminal comprising:
   a plurality of Non Access Stratum (NAS) modules configured to perform a NAS procedure related to a network; and
   a multi mode NAS module configured to:
   receive a NAS procedure request signal from a user, and select a first NAS,
   transmit the NAS procedure request signal to a NAS module corresponding to the first NAS,
   receive a NAS procedure response signal including an execution result of a first NAS procedure between the NAS module corresponding to the first NAS and a network, from the NAS module corresponding to the first NAS,
   perform synchronization between the NAS module corresponding to the first NAS and a NAS module corresponding to a second NAS according to the first NAS procedure execution result,
   transmit a NAS procedure response signal including the first NAS procedure execution result to the user,
   receive a NAS procedure failure response from the NAS module corresponding to the first NAS when a handover occurs in the first NAS procedure,
   transmit the NAS procedure request signal to the NAS module corresponding to the second NAS when the handover occurs in the first NAS procedure, and
   receive a NAS procedure response signal including an execution result of a second NAS procedure between the NAS module corresponding to the second NAS and the network, from the NAS module corresponding to the second NAS, when the handover occurs in the first NAS procedure.

5. The multi-mode terminal according to claim 4, wherein one of the first NAS and the second NAS is an enhanced NAS (eNAS) of a Long Term Evolution (LTE) system.

6. The multi-mode terminal according to claim 4, wherein the multi mode NAS module performs context mapping to the second NAS in relation to the first NAS procedure execution result.

* * * * *